United States Patent
Crockett, IV et al.

(10) Patent No.: US 7,389,568 B2
(45) Date of Patent: Jun. 24, 2008

(54) COMPRESSION HOSE CLAMP

(75) Inventors: Watkins Crockett, IV, Franklin, TN (US); Jonathan L. Chilson, Lavergne, TN (US); Duane M. Farmer, Murfreesboro, TN (US); Rex Fayter, Murfreesboro, TN (US); David A. Ramsey, Lavergne, TN (US); Gene C. Holz, Murfreesboro, TN (US); Brian J. Adamo, Lavergne, TN (US)

(73) Assignee: Epicor Industries, Inc., St. Augustine, FL (US)

( * ) Notice: Subject to any disclaimer, the term of this patent is extended or adjusted under 35 U.S.C. 154(b) by 0 days.

(21) Appl. No.: 11/459,818

(22) Filed: Jul. 25, 2006

(65) Prior Publication Data

US 2007/0022578 A1 Feb. 1, 2007

Related U.S. Application Data

(60) Provisional application No. 60/703,116, filed on Jul. 27, 2005.

(51) Int. Cl.
*F16L 33/08* (2006.01)

(52) U.S. Cl. ............................ 24/274 R; 24/20 R

(58) Field of Classification Search ............ 24/19, 24/20 R, 21, 22, 274 R, 274 P, 274 WB, 279–282 B, 24/274 W; 285/410, 420
See application file for complete search history.

(56) References Cited

U.S. PATENT DOCUMENTS

| | | | |
|---|---|---|---|
| 2,423,195 A * | 7/1947 | Longden | 24/279 |
| 4,244,088 A | 1/1981 | Sauer | |
| 4,308,648 A | 1/1982 | Fay | |
| 4,402,113 A * | 9/1983 | Smith | 24/20 R |
| 4,473,928 A | 10/1984 | Johnson | |
| 4,667,375 A | 5/1987 | Enlund | |
| 5,115,541 A | 5/1992 | Stichel | |
| 5,309,607 A | 5/1994 | Hohmann et al. | |
| 5,353,478 A | 10/1994 | Spors | |
| 5,499,430 A * | 3/1996 | Strazar | 24/279 |
| 5,613,281 A | 3/1997 | Oetiker | |
| 5,630,255 A | 5/1997 | Eliasson | |
| 5,706,558 A | 1/1998 | Sauer | |
| 6,000,104 A | 12/1999 | Mann | |
| 6,088,886 A | 7/2000 | Gyongyosi | |

(Continued)

FOREIGN PATENT DOCUMENTS

DE 41 08 852 A1 * 9/1992

(Continued)

*Primary Examiner*—Robert J. Sandy
*Assistant Examiner*—Ruth C. Rodriguez
(74) *Attorney, Agent, or Firm*—James Addison Barry, Jr.; Paul N. Dunlap; Curtis H. Castleman

(57) ABSTRACT

A hose clamp 100 including a band 120 with an integrated wave-form 110 formed in the band 120 for spring compensation during thermal cycling and material aging, and notches 122 formed in the band 120; a housing 150; a worm gear screw 140 for tensioning the hose clamp; a compression liner 130 inserted in the inside circumference of the band 120 to increase clamp unit loading by concentrating the load radially inward around and through the circumference of the band 120; and an attachment means to secure the compression liner 130 in place with the band 120.

19 Claims, 5 Drawing Sheets

U.S. PATENT DOCUMENTS

| | | |
|---|---|---|
| 6,598,269 B2 | 7/2003 | Oetiker et al. |
| 6,773,037 B2 * | 8/2004 | Spurgat .................. 24/279 |
| 2006/0162131 A1 * | 7/2006 | Bowater .................. 24/19 |

FOREIGN PATENT DOCUMENTS

| | | | |
|---|---|---|---|
| DE | 103 55 118 A1 | * | 6/2004 |
| DE | 103 00 562 | * | 8/2004 |
| JP | 405209699 A | * | 8/1993 |
| JP | 409166257 A | * | 6/1997 |
| JP | 11315981 A | * | 11/1997 |
| WO | WO 96/34223 | * | 10/1996 |

* cited by examiner

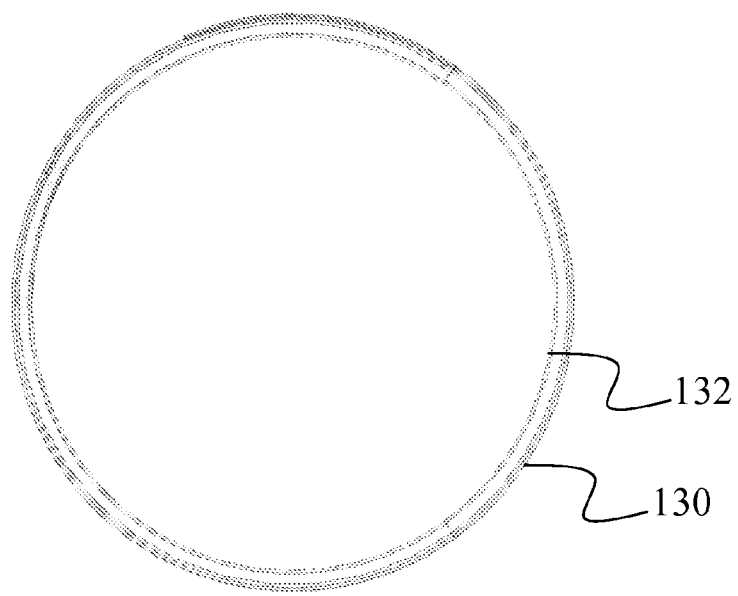
FIG. 2A
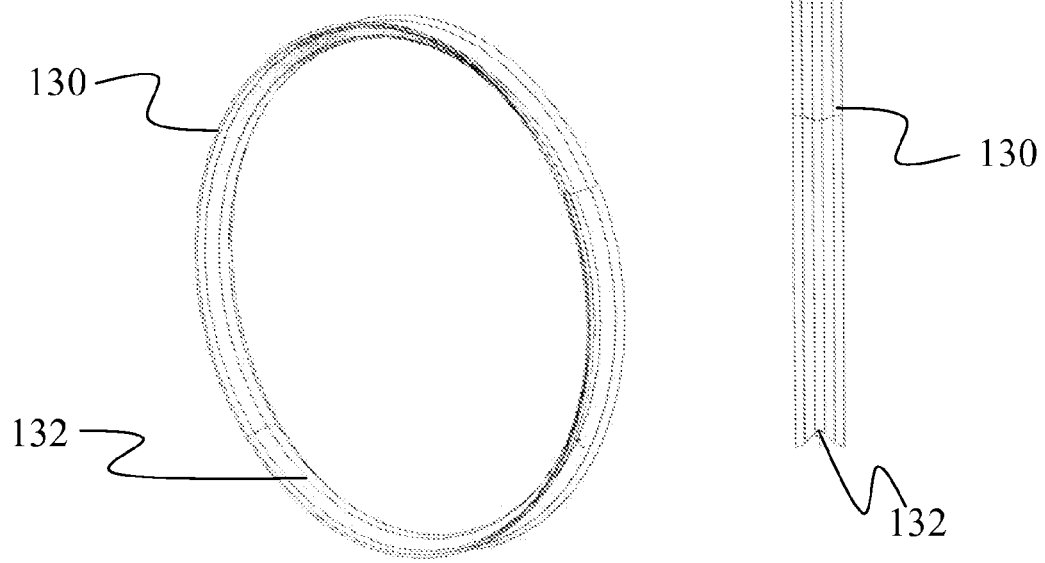
FIG. 2B
FIG. 2C

COMPRESSION HOSE CLAMP

CROSS-REFERENCE

This application claims the benefit of U.S. Provisional Application Ser. No. 60/703,116, filed Jul. 27, 2005, titled Wave-form, Compression Hose Clamp. The present application is related by the same inventors for all applications; Watkins Crockett IV, Jonathan L. Chilson, Duane M. Farmer, Rex Fayter, David A. Ramsey, Gene C. Holz, Brian J. Adamo. The U.S. Provisional Application Ser. No. 60/703,116, filed Jul. 27, 2005, titled Wave-form, Compression Hose Clamp is hereby incorporated in its entirety by reference.

FIELD OF THE INVENTION

The present invention relates to a hose clamp, and provides a means for increasing the clamp unit loading. In addition, this invention provides spring compensation to help overcome hose shrinkage and expansion during thermal cycling.

BACKGROUND OF THE INVENTION

Worm gear screw hose clamps are very well known, the clamp being tightened or loosened by rotation of the worm gear screw in the respective direction, the rotation moving the tang to increase or decrease its degree of overlap with the remainder of the metal band and hence the periphery of the clamp. Several major problems may arise with this type of clamp. Some hose materials, especially silicone rubber materials, tend to extrude through the notches on tightening the clamp about the article being clamped. Such extrusions not only damage the hose but also tend to cause the clamp to stick and be difficult to loosen again when necessary. Hose extrusion also hinders other spring compensating clamps with the clamps ability to compensate joint fluctuation during thermal cycling. Another problem is associated with thermal changes. The changes in temperature create expansion and contraction of the hose, the fitting and the clamp. A number of attempts to compensate for thermal expansion during the operation of an assembled connection as well as to compensation for the aging or cold set of the hose itself have been attempted. A further problem is to maintain a fluid-tight seal throughout the intended life of the assembly, without requiring the clamp to be re-tightened.

It would be desirable to have a worm gear screw hose clamp that provides spring compensation to help overcome the hose shrinkage and expansion during thermal cycling, provides a liner that increases the clamp unit loading, and also provides a cover for the exposed notches in the band and will prevent any hose material from extruding through the notch area.

BRIEF DESCRIPTION OF THE DRAWINGS

These and other features, aspects, and advantages of the invention will become better understood with regard to the following description, appended claims, and accompanying drawings where:

FIG. 2A is a front view of the compression insert of FIG. 1 according to the present invention;

FIG. 2B is a perspective view of the compression insert of FIG. 1 according to the present invention;

FIG. 2C is a side view of the compression insert of FIG. 1 according to the present invention;

DETAILED DESCRIPTION OF THE INVENTION

The present invention relates to the field of hose clamps, and provides a means for increasing the hose clamp unit loading. In addition, this invention provides spring compensation to help overcome hose shrinkage and expansion during thermal cycling. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Figure 1A:
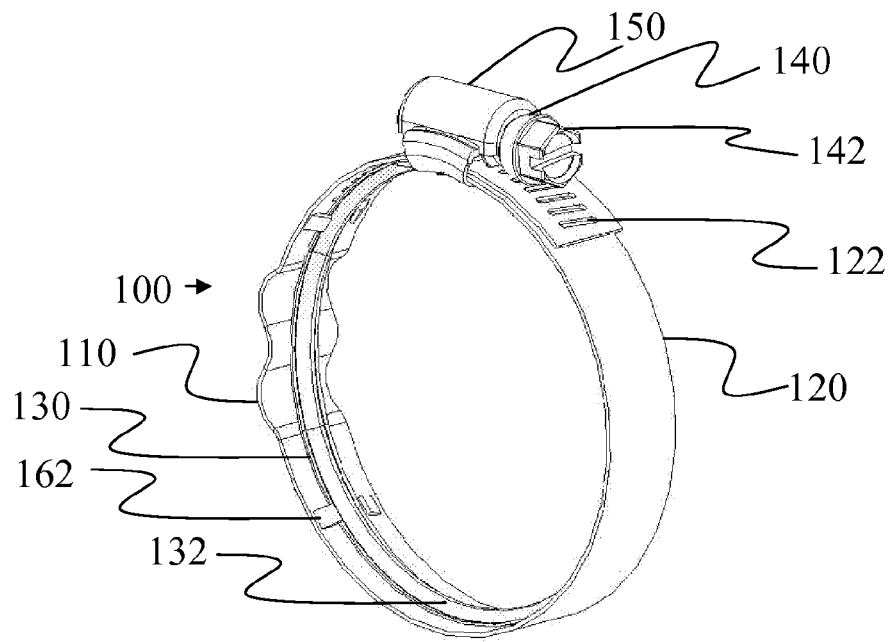
FIG. 1A is a perspective view of one embodiment of the clamp according to the present invention.
Figure 1B:
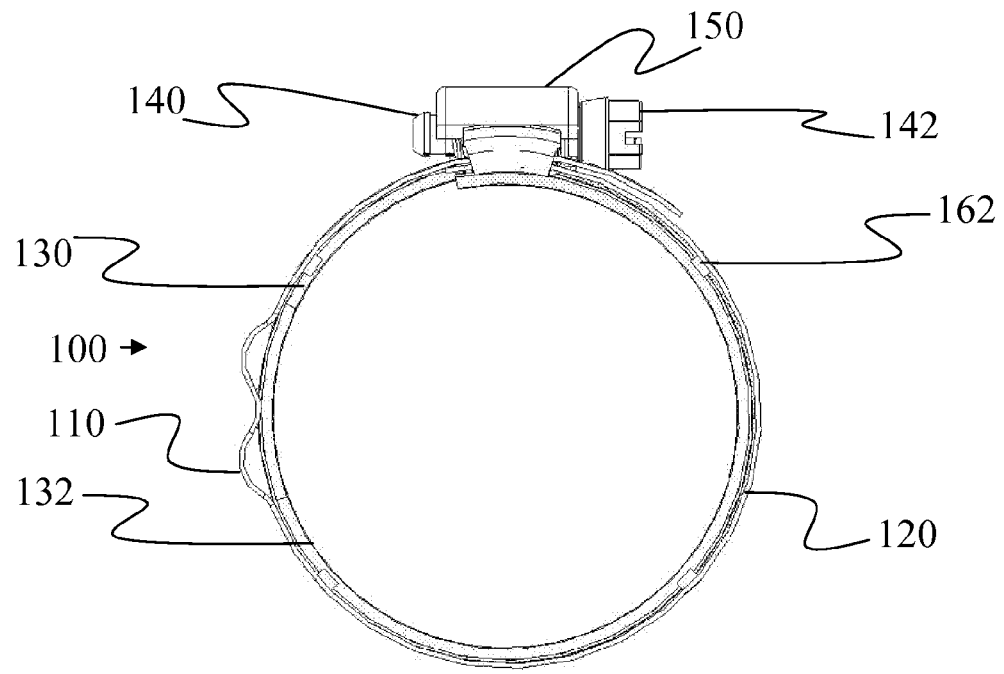
FIG. 1B is a front view of the clamp of FIG. 1A according to the present invention.

Overview of the Invention:

As depicted in FIGS. 1A and 1B, the present invention is a hose clamp 100 that uses a wave-form 110 integrated into a band 120 to provide the spring compensation to help overcome the hose shrinkage and expansion during thermal cycling. In one embodiment the band 120 is comprised of a stainless material that is temper rolled to the full-hard condition to increase the available "memory" in the wave-form giving it spring like characteristics. The hose clamp 100 has a compression liner 130 inside a circumference of the band 120 that increases the clamp unit loading. The liner 130 may also cover up exposed notches 122 in the band 120 and help prevent hose material from extruding through the notched area.

One embodiment of the wave-form 110, compression hose clamp 100 includes 1) a worm gear screw 140 for tensioning the hose clamp 100; 2) a band 120 including a wave-form 110 of corrugations integrated into the band 120 that provide the spring compensation to help overcome the hose shrinkage and expansion during thermal cycling; 3) a compression liner 130 for the inside circumference of the clamp 100 that increases the clamp unit loading and may cover up the exposed notches 122 in the band 120 and helps prevent hose material from extruding through the notched area; and 4) an attachment means in the band 120 to hold the liner 130 in place in relation to the width of the band 120.

Design Specifications:

As depicted in FIGS. 1A and 1B, one embodiment of the wave-form 110, compression hose clamp 100 comprises the following: a band including: notches 122 are formed in the first end of the metal band 120 for engaging the worm gear screw 140 for tightened and loosening the band 120, and a wave-form 110 is formed into the band 120 to maintain load during temperature changes of hot and cold as well as to maintain load during the aging of the clamped material; a worm gear screw 140 attached with a housing 150 attached with a second end of the metal band 120; a compression liner 130 is inserted into the inside circumference of the band 120 to increase the load and concentrate the load radially inward from the tension of the circumference of the band 120. The liner 130 comprises a width such that the width of the liner 130 substantially covers the notches 122. Substantially is at least 50 percent. In addition, the liner 130 keeps the hose from extruding through the notches 122 as well as keeping the hose from extruding into the wave-form 110. The band 120 includes an attachment means for securing the liner 130.

A hose clamp 100 of the present invention includes a suitable length of metal strip. Hose clamps without the wave-form typically use a ½ hard band or temper roll. The metal band 120 or strip of the present invention may include stainless or high strength low alloy steel material to obtain resilience or hardness in the strip or band 120 for maximum spring memory from the wave-form 110 or corrugations but still allow for the cutting and punching of the notches 122. The preferred material is full hard stainless for maximum spring memory with the wave-form 110. However, alternate materials include but are not limited to high strength low alloy carbon steel (HSLA), and heat treated materials but may use materials with higher tensile properties that fall within this category. The metal strip or band 120 is provided with elongated slots or notches 122 disposed at an angle to the longitudinal axis of the strip 120 at the first end of the strip 120. The choice of angle of the elongated notches 122 is such that the notches 122 form a rack for a worm gear screw 140 that is mounted for rotation about its longitudinal axis in the housing 150 such that the notches 122 and the worm gear screw 140 engage for tensioning the hose clamp 100. Usually the notches 122 extend over a predetermined length at the first end of the strip 120 corresponding to the required range of diameters for the clamp 100. The housing 150 is fastened or attached with the second end of the strip 120 in a conventional manner. The worm gear screw 140 has the usual hex shaped head 142 provided with an optional screw driver slot or Phillips head combo slot. The worm gear screw 140 and housing 150 may be a stainless, carbon or HSLA material. The wave-form 110 or corrugations are formed in the metal band 120 by tooling. The wave-form 110 functions as a tension spring to maintain load during temperature changes of hot and cold as well as to maintain load during the aging of the clamped material. The wave-form 110 returns the clamp 100 to the memory position. The wave-form 110 may be one or more waves circumferentially spaced that are yieldable in a direction circumferentially of the band 110. Typically, two waves may be used with small to medium clamps and three waves with larger clamps where the wave-form is disposed in areas that are not notched or are void of notches. In some applications, more than one set of wave-forms may be needed where the wave-forms are spread out around the circumference of the band in areas that are not notched.

Figure 3A:
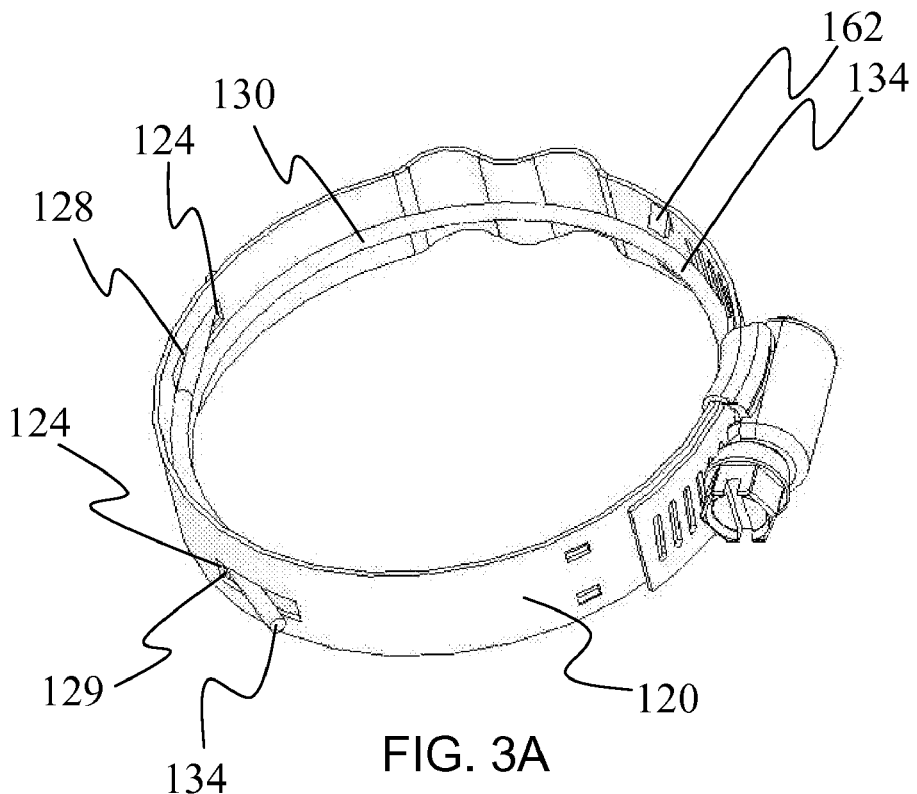
FIG. 3A is a perspective view of another embodiment of the clamp including a compression liner comprising a geometric-shaped material according to the present invention.
Figure 3B:
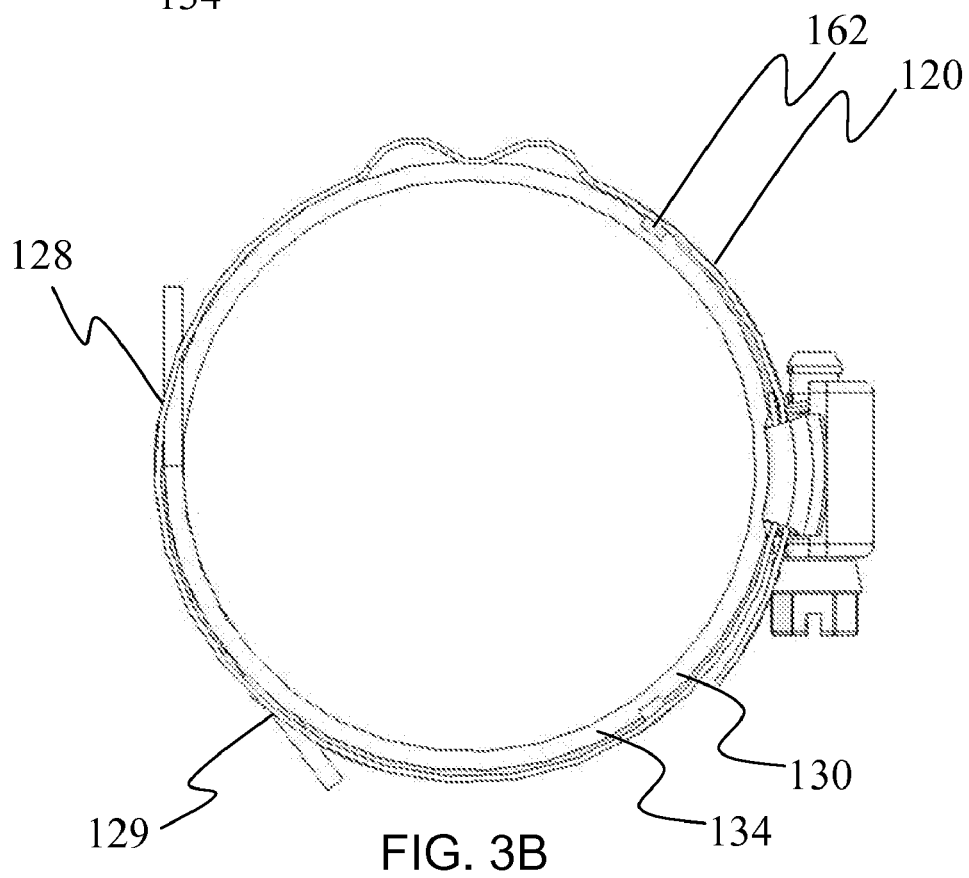
FIG. 3B is a front view of the embodiment of FIG. 3A according to the present invention.
Figure 4:
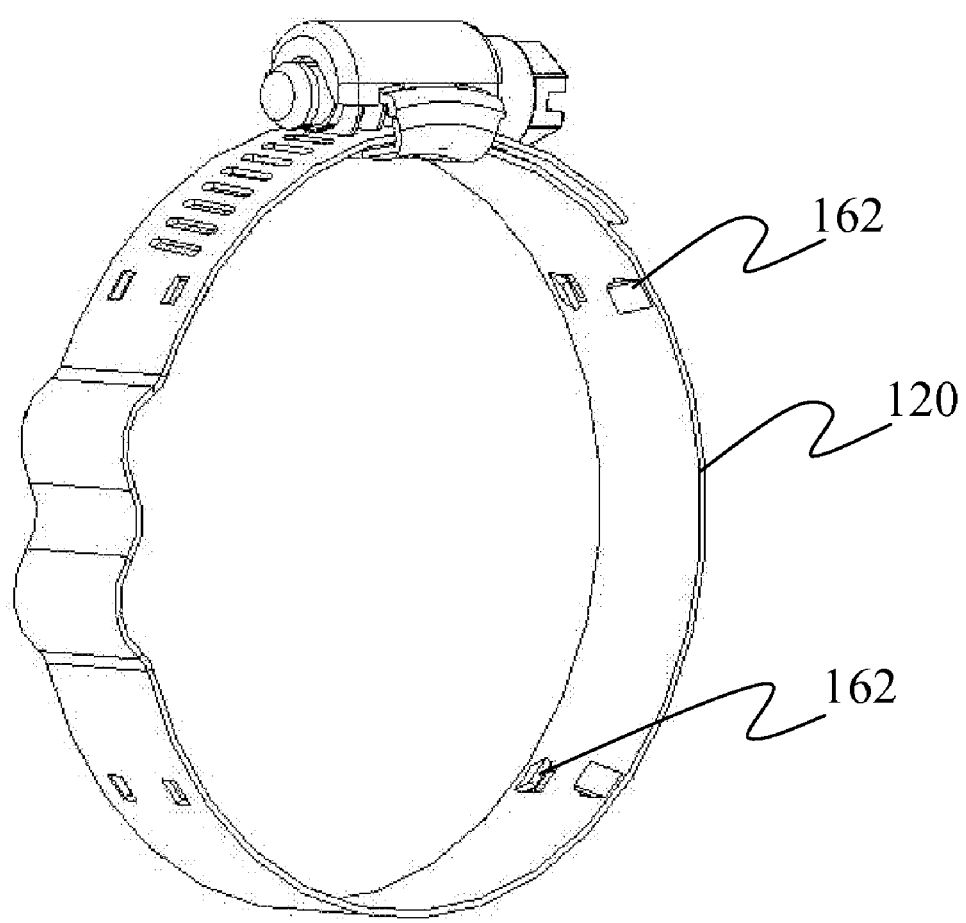
FIG. 4 is a perspective view of another embodiment of the clamp without compression liner inserted depicting lances as an attachment means according to the present invention.
Figures 5A, 5B, 5C:
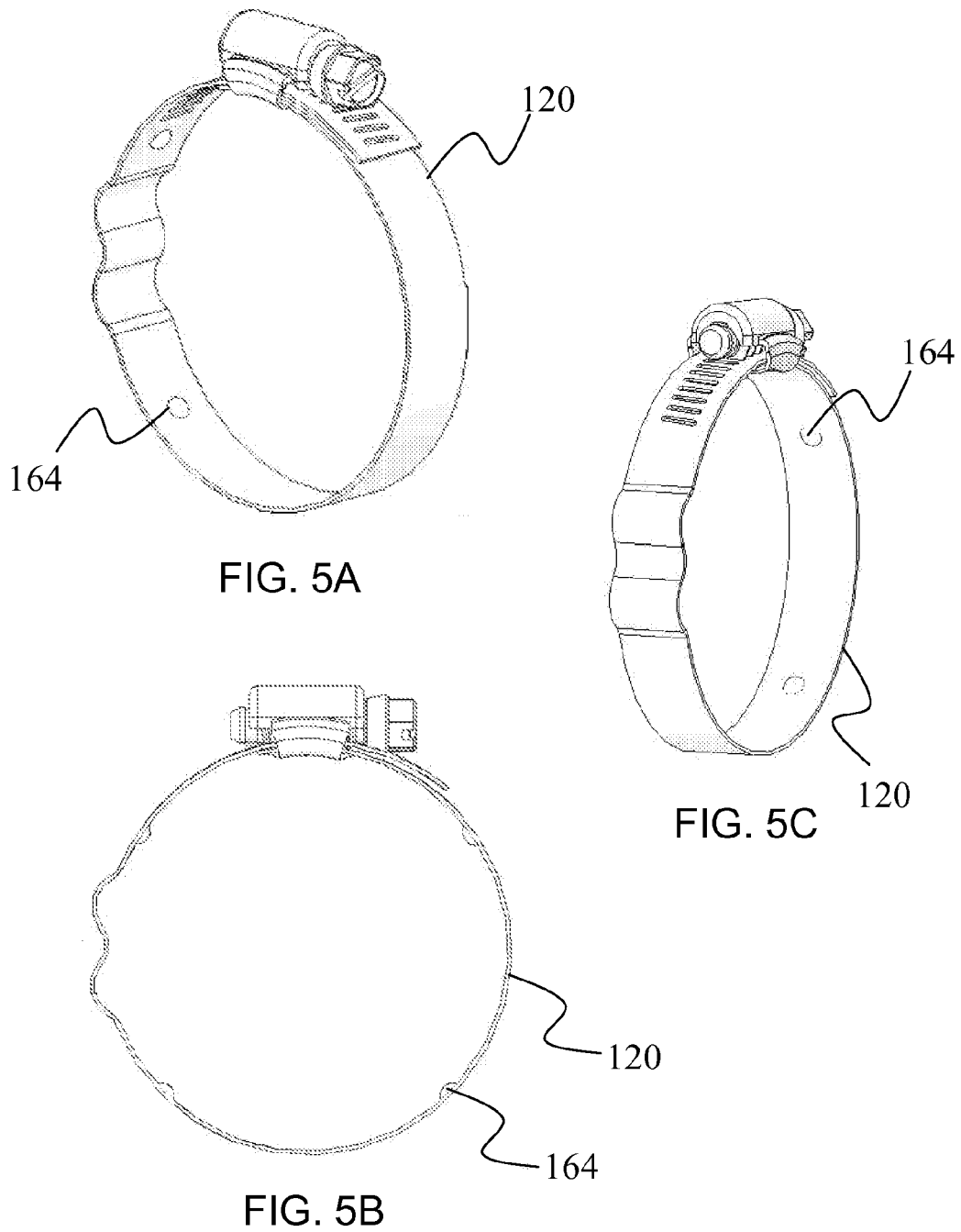
FIG. 5A is a perspective view of another embodiment of the clamp without compression liner inserted depicting dimples as an attachment means according to the present invention.
FIG. 5B is a front view of the clamp shown in FIG. 5A according to the present invention.
FIG. 5C is another perspective view of the clamp shown in FIG. 5A according to the present invention.

The wave-form 110, compression hose clamp 100 includes a compression liner 130 that is inserted into an inside circumference of the band 120. The compression liner 130 increases the load and concentrates the load radially inward along the circumference of the band 120. In one embodiment as shown in FIGS. 2A, 2B and 2C, the compression liner 130 is a V-shaped 132 liner 130 or a U-shaped liner. The V-shaped 132 liner 130 may be stainless shield material, slit to the correct width from the bulk material roll. The material that is slit to width is stamped or wheel formed creating the shape of a "V" protruding from the previously flat surface. The V-shaped 132 material is curled or formed into a round or circular shape. The U-shaped liner is similar to the V-shaped liner 130 however the portion of the U-shaped liner engaging the hose is more rounded or blunt than the V-shaped liner 130. As depicted in FIGS. 1A and 1B, the width of the V-shaped 132 insert 130 substantially covers the notches 122 of the band 120 so that there is little or no clamped material or hose extrusion in the band 120 as well as the waves 110 or corrugations. The length of the V-shaped 132 liner 130 may be such that the two ends of the V-shaped 132 liner 130 will overlap when inserted in the circumference of the metal band 120. The overlap location may be placed at any position inside the clamp 100 or the overlap location may be disposed approximately 180 degrees around the circumference of the band from the wave-form. In another embodiment, the compression liner 130 includes a length of material comprising a geometric-shaped cross section where the width of the liner is such that the width partially covers the notches. Partially covering the notches is covering between 20 and 50 per cent of the width of the notches 122. The geometric-shaped cross section material may include a circular-shaped material such as a curled rod 134 or wire that is formed into a round or circular shape as depicted in FIGS. 3A and 3B. The band may have an aperture 124 or opening that may have a gradual slope in the metal band 120 for transition of the geometric-shaped cross section material 134 when entering and exiting the metal band 120. The metal band 120 may also have lances 162, lanes, grooves, or a trough to maintain the geometric-shaped cross section material in the desired location on the width of the metal band 120 when the liner is inserted in the band. The length of the geometric-shaped cross section material may be long enough to protrude from an aperture 124 or opening formed on the metal band 120. The geometric-shaped cross section material in the location between the hose and the metal band 120 will produce an O ring effect to increase the loading similar to the V-shaped 132 liner 130 previously discussed. The compression liner 130 geometric-shaped cross section material may include but is not limited to a circular-shaped material, a triangular-shaped material, or a semicircle-shaped material. The aperture 124 in the metal band 120 may have different entry 128 and exit 129 apertures 124 for transition of the geometric-shaped material as well as different shapes of apertures to match the geometric-shaped material cross section. Wherein the compression liner 130 geometric-shaped material is circular-shaped 134, semicircular-shaped, or triangular-shaped, the material may be any material that would not bind on itself or material that it would come in contact with under this application. The material may include but is not limited to material with a solid cross-section or a material with a tubular cross-section with a desired wall thickness. This tubular cross-section could also act as a spring feature that could provide additional compensation or counter-act material (hose) creep. This could include but is not limited to plastic, stainless, or carbon steel. Dissimilar materials may also be used to minimize the gall or freeze up of similar metals such as steel with steel.

As shown in FIGS. 1A, 1B, 3A, 3B, 4, 5A, 5B, and 5C, the attachment means for the compression liner 130 is a way of securing the liner 130 within the circumference of the metal band 120. The attachment means may vary with the particular embodiment. The preferred manner of attachment for the V-shaped 132 compression liner 130 embodiment is placing a series of parallel lances 162 in the band 120 to secure or hold the insert 130 in place in relation to the width direction of the band 120 but still allow movement of the liner 130 in the length or circumference direction. Other means of securing the V-shaped 132 compression liner 130 may include but not be limited to: a series of parallel dimples 164 in the band 120 to secure the width direction movement; or a weld such that the attachment means secures the liner 130 in place in relation to the width direction of the band 120 and allows movement of the liner 130 in the circumference, length direction. With an embodiment wherein the attachment means is welding, one end of the V-shaped 132 compression liner 130 may be welded or a point between the ends of the liner 130 may be welded. A combination of these methods may be used to maintain the liner 130 in place in relation to the width direction of the band 120 and allow movement of the insert 130 in the length or circumference direction. For another embodiment wherein the compression liner 130 geometric-shaped material is a circular-shaped, semicircular-shaped or triangular-shaped material, the attachment means may include but is not limited to: a trough to keep the liner 130 in correct position within the inside circumference of the hose clamp 100 so as to maintain the liner 130 in place in relation to the width direction of the band 120 and to allow the material to ride within the trough so as to allow movement of the liner 130 in the circumference, length direction; or lances, or dimples to keep the liner in the correct position within the inside circumference of the hose clamp 100 and to maintain the liner 130 in place in relation to the width direction of the band 120.

Manner of Use:

As referenced in FIG. 1A, the wave-form 110, compression hose clamp 100 may be used without the compression liner 130 but is more effective when used in combination with the liner 130. For varied applications, the hose clamp 100 may also include in different combinations the following additional features: a double headed breakaway screw wherein the breakaway head screw fails at a certain torque; a mark on the band to know when the band is tighten to a certain torque, when the mark is no longer visible the band is tightened; an additional lance that protrudes from the outer perimeter of the metal band to stop the metal band at a certain spot; a slot or side notch positioned a certain way or location so that the clamp is always clamped in a correct position; or flaring the edges of the metal band to put a slight angle on the edge to concentrate the load to the center of the clamp, for reducing the cross section of the footprint to increase the unit load. The clamp assembly may be pre-positioned on the hose or clamped material using a separate clip feature that is attached to the spring compensating clamp.

Uniqueness:

In one embodiment, the present invention has a worm gear screw 140 hose clamp 100 that provides a spring compensation feature, wave-form 110, that helps to overcome the loss of clamping load resulting from the shrinkage and/or expansion of the clamped material; provides a "U" or "V" shaped 132 liner 130 that increases the clamping force (pressure) unit loading applied to the clamped material; and also provides a cover for the exposed serrations or irregularities in the band 120 and prevents extrusion of the clamped material through the serration area. The spring compensation feature is a wave-form 110 consisting of one or more corrugations placed in the clamp band 120 where the spring compensation feature utilizes the material's "memory" introduced during the wave forming or stamping operation, to maintain an axial load level in the clamp band 120 during any shrinkage or expansion of the clamped material. The wave-form 110, compression hose clamp 100 provides a V-shaped 132 insert that is curled and inserted into a hose clamp 100 the V-shaped liner 132 takes the load and concentrates the load radially inward along the circumference. In addition, the present invention also uses wave-form 110 or corrugation in the metal band 120 for memory in the wave-form 110 for tension and stretch to maintain load in hot or cold environments with thermal cycling. The wave-form 110, outer metal band 120 in combination with the inner V-shaped 132 or geometric-shaped cross section material allow the hose clamp 100 to maintain loading under numerous conditions.

What is claimed is:
1. A hose clamp comprising:
 a band further comprising:
  notches formed in the band disposed at a first end of the band disposed at an angle to a longitudinal axis of the band, and
  an integrated wave-form formed in the band circumferentially spaced such that the wave-form is yieldable in a direction circumferentially of the band for spring compensation during thermal cycling and material aging wherein the wave-form is formed in the band where the band is void of notches;
 a housing attached to a second end of the band;
 a worm gear screw attached with the housing such that the notches and the worm gear screw engage for tensioning the hose clamp;
 a compression liner inserted entirely within the inside of a circumference of the band to increase clamp unit loading by concentrating the load radially inward from the tension of the circumference of the band, the liner further comprising a width of the liner such that the width substantially covers the notches and is smaller than the width of the band; and
 an attachment means to secure the liner in place in relation to a width direction of the band and to allow movement of the liner in the circumference, length direction.
2. A hose clamp as set forth in claim 1 wherein the wave-form further comprises two waves.
3. A hose clamp as set forth in claim 1 wherein the wave-form further comprises three waves.
4. A hose clamp as set forth in claim 1 wherein the band further comprises multiple sets of waves-forms disposed around the circumference of the band.
5. A hose clamp as set forth in claim 1 wherein the compression liner further comprises a V-shaped liner, and a length of the V-shaped liner such that both ends of the V-shaped liner overlap when inserted in the band.
6. A hose clamp as set forth in claim 5 wherein the compression liner overlap is disposed approximately 180 degrees around the circumference of the band from the wave-form.
7. A hose clamp as set forth in claim 1 wherein the compression liner further comprises a U-shaped liner.
8. A hose clamp as set forth in claim 1 wherein the attachment means further comprises a weld such that the weld secures the liner in place in relation to the width direction of the band and allows movement of the liner in the circumference, length direction.
9. A hose clamp comprising:
 a band further comprising:
  notches formed in the band disposed at a first end of the band disposed at an angle to a longitudinal axis of the band, and
  an integrated wave-form formed in the band circumferentially spaced such that the wave-form is yieldable in a direction circumferentially of the band for spring compensation during thermal cycling and material aging wherein the wave-form is formed in the band where the band is void of notches;
 a housing attached to a second end of the band;

a worm gear screw attached with the housing such that the notches and the worm gear screw engage for tensioning the hose clamp;

a compression liner inserted in the inside of a circumference of the band to increase clamp unit loading by concentrating the load radially inward from the tension of the circumference of the band such that the liner ends follow the approximate curvature of the band, the liner further comprising:

a length of material comprising a geometric-shaped cross section selected from a triangular shape, a semicircle shape, and a tubular shape, and a width of the liner such that the width partially covers the notches; and an attachment means to secure the liner in place in relation to a width direction of the band and to allow movement of the liner in the circumference, length direction; and wherein the band further comprises an entrance aperture and an exit aperture shaped to match the material geometric-shaped cross section.

10. A hose clamp as set forth in claim 8 wherein the liner length of material includes a length such that the liner protrudes from the entrance aperture and the exit aperture when the liner is inserted in the band.

11. A hose clamp as set forth in claim 9 wherein the attachment means further comprises a trough such that the trough secures the liner in place in relation to the width direction of the band and allows movement of the liner in the circumference, length direction.

12. A hose clamp as set forth in claim 9 wherein the geometric-shaped cross section is a triangular-shaped material.

13. A hose clamp as set forth in claim 12 wherein the attachment means further comprises a trough such that the trough maintains the triangular-shaped material in the desired location on the width of the band and such that the trough allows the material to ride within the trough.

14. A hose clamp as set forth in claim 9 wherein the geometric-shaped cross section is a semicircle-shaped material.

15. A hose clamp as set forth in claim 9 wherein the geometric-shaped cross section is a tubular-shaped material.

16. A hose clamp comprising:

a band further comprising:

notches formed in the band disposed at a first end of the band disposed at an angle to a longitudinal axis of the band, and an integrated wave-form formed in the band circumferentially spaced such that the wave-form is yieldable in a direction circumferentially of the band for spring compensation during thermal cycling and material aging wherein the wave-form is formed in the band where the band is void of notches;

a housing attached to a second end of the band;

a worm gear screw attached with the housing such that the notches and the worm gear screw engage for tensioning the hose clamp;

a compression liner inserted entirely within the inside of a circumference of the band to increase clamp unit loading by concentrating the load radially inward from the tension of the circumference of the band, the liner further comprising a width of the liner such that the width substantially covers the notches and is smaller than the width of the band, and a length of the liner such that both ends of the liner overlap radially when inserted in the band; and an attachment means to secure the liner in place in relation to a width direction of the band and to allow movement of the liner in the circumference, length direction wherein the attachment means further comprises dimples or parallel lances or a weld disposed in the band such that the dimples or parallel lances or weld secure the liner in place in relation to the width direction of the band and allow movement of the liner in the circumference, length direction.

17. A hose clamp comprising:

a band further comprising:

notches formed in the band disposed at a first end of the band disposed at an angle to a longitudinal axis of the band, and an integrated wave-form formed in the band circumferentially spaced such that the wave-form is yieldable in a direction circumferentially of the band for spring compensation during thermal cycling and material aging wherein the wave-form is formed in the band where the band is void of notches;

a housing attached to a second end of the band;

a worm gear screw attached with the housing such that the notches and the worm gear screw engage for tensioning the hose clamp;

a compression liner inserted in the inside of a circumference of the band to increase clamp unit loading by concentrating the load radially inward from the tension of the circumference of the band, the liner further comprising a width of the liner such that the liner width is less than the band width and the liner width substantially covers the notches wherein the compression liner further comprises a V-shaped liner, and a length of the V-shaped liner such that both ends of the V-shaped liner overlap when inserted in the band; and an attachment means to secure the liner in place in relation to a width direction of the band and to allow movement of the liner in the circumference, length direction.

18. A hose clamp comprising:

a band further comprising:

notches formed in the band disposed at a first end of the band disposed at an angle to a longitudinal axis of the band, and an integrated wave-form formed in the band circumferentially spaced such that the wave-form is yieldable in a direction circumferentially of the band for spring compensation during thermal cycling and material aging wherein the wave-form is formed in the band where the band is void of notches;

a housing attached to a second end of the band;

a worm gear screw attached with the housing such that the notches and the worm gear screw engage for tensioning the hose clamp;

a compression liner inserted in the inside of a circumference of the band to increase clamp unit loading by concentrating the load radially inward from the tension of the circumference of the band, the liner further comprising a width of the liner such that such that the liner width is less than the band width and the liner width substantially covers the notches wherein the compression liner further comprises a U-shaped liner, and a length of the U-shaped liner such that both ends of the U-shaped liner overlap when inserted in the band; and an attachment means to secure the liner in place in relation to a width direction of the band and to allow movement of the liner in the circumference, length direction.

19. A hose clamp as set forth in claim 1 wherein the compression liner further comprises a length such that both ends of the liner overlap radially when inserted in the band.

* * * * *